L. J. DEUSTER & C. HONOUR.
POTATO BUG CATCHER.
APPLICATION FILED JULY 1, 1913.
1,091,200.
Patented Mar. 24, 1914.
2 SHEETS—SHEET 1.
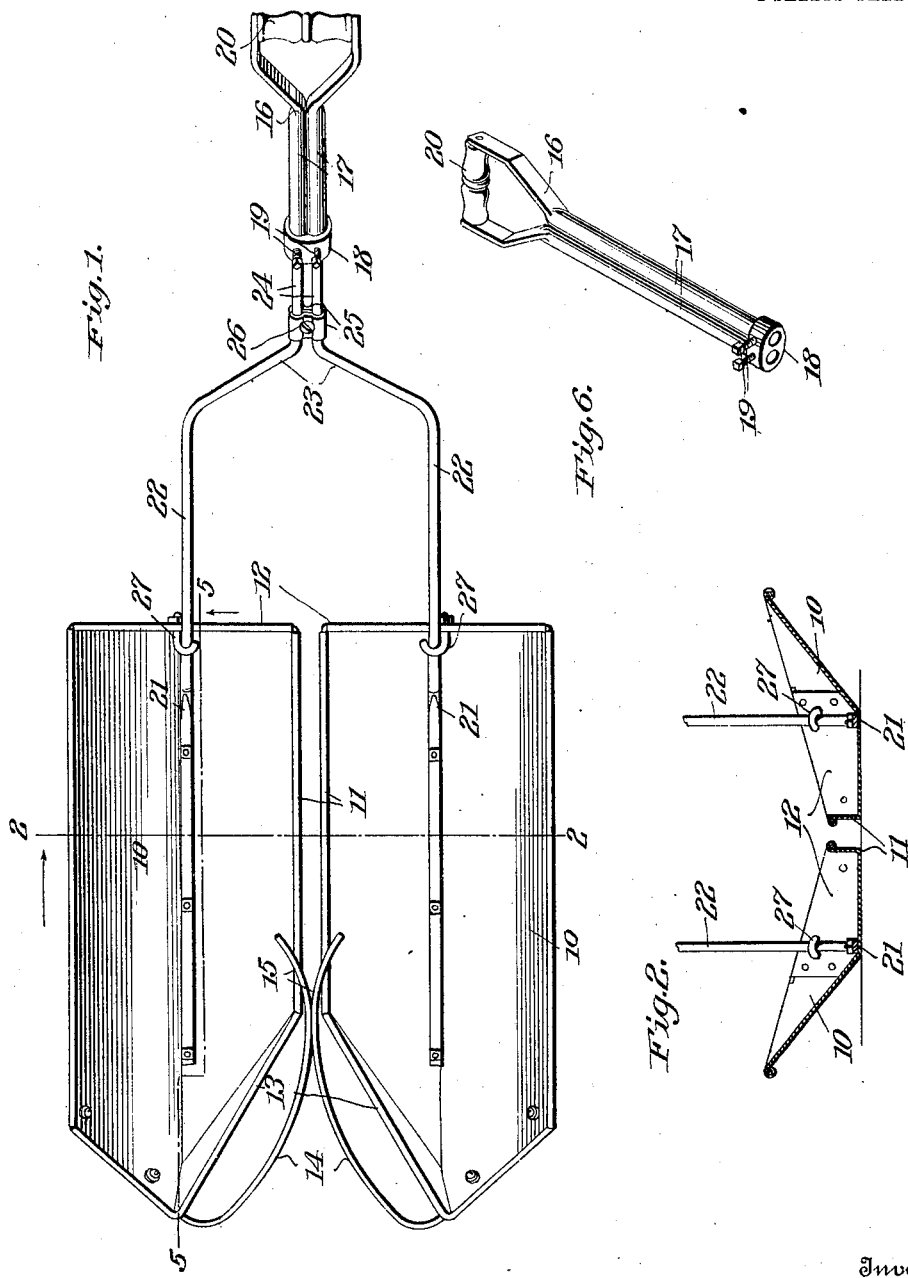
Witnesses
Gerald Hennesy.
Wm Bayger.
Inventors
Leo J. Deuster and
Charles Honour,
By Victor J. Evans
Attorney.

L. J. DEUSTER & C. HONOUR.
POTATO BUG CATCHER.
APPLICATION FILED JULY 1, 1913.
1,091,200.
Patented Mar. 24, 1914.
2 SHEETS—SHEET 2.
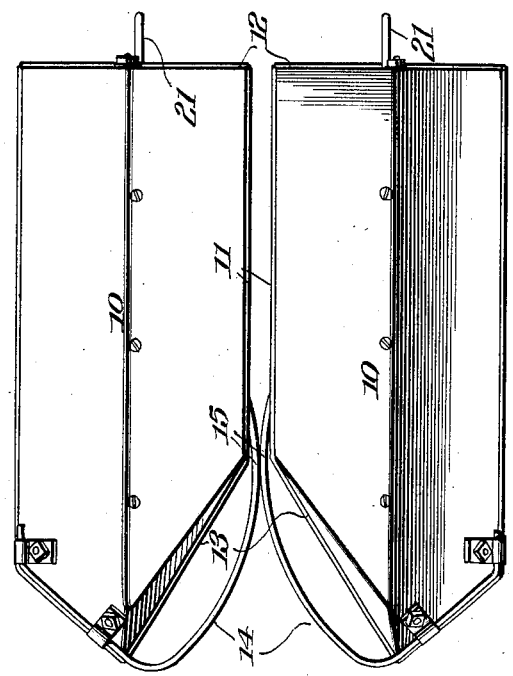
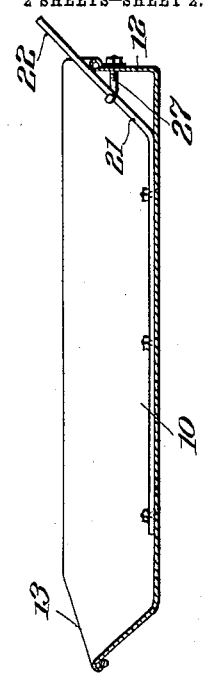
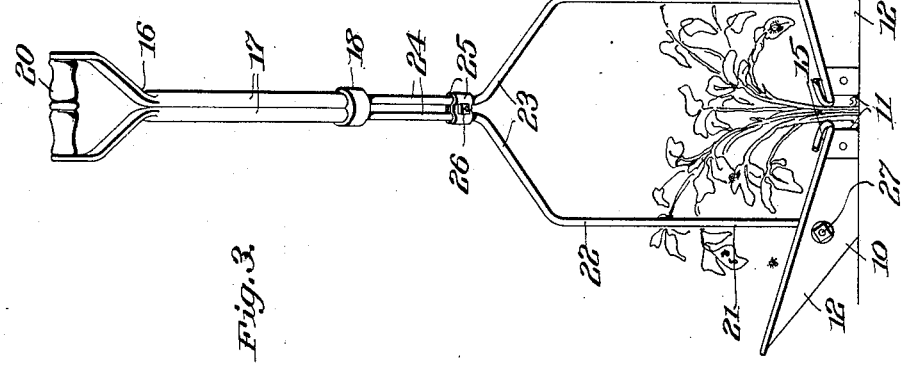
Witnesses
Gerald Hennesy
Wm Bayger
Inventor
Leo J. Deuster and
Charles Honour;
By Victor J. Evans
Attorney

UNITED STATES PATENT OFFICE.

LEO J. DEUSTER AND CHARLES HONOUR, OF SUTTONS BAY, MICHIGAN.

POTATO-BUG CATCHER.

1,091,200.   Specification of Letters Patent.   Patented Mar. 24, 1914.

Application filed July 1, 1913. Serial No. 776,874.

*To all whom it may concern:*

Be it known that we, LEO J. DEUSTER and CHARLES HONOUR, citizens of the United States, residing at Suttons Bay, in the county of Leelanaw and State of Michigan, have invented new and useful Improvements in Potato-Bug Catchers, of which the following is a specification.

This invention relates to devices for catching and gathering potato bugs, and it has for its prime object to produce a device of this class which will be simple and inexpensive and which may be manually operated with good results.

A further object of the invention is to produce a potato bug gatherer comprising gathering pans adapted to be pushed over the ground adjacent to the sides of the potato plants, said pans being connected with and supported by a suitable handle whereby they may be manually operated, and said pans being provided with plant engaging means that will prevent injury to the plants.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings 1 is a top plan view of a bug gathering device constructed in accordance with the invention. Fig. 2 is a transverse sectional view taken on the line 2—2 in Fig. 1. Fig. 3 is a rear elevation showing the device in operation. Fig. 4 is a bottom plan view. Fig. 5 is a longitudinal sectional view taken through one of the gathering pans on the line 5—5 in Fig. 1. Fig. 6 is a perspective detail view of the handle portion of the device.

Corresponding parts in the several figures are denoted by like characters of reference.

In the construction of the improved implement there is included two gathering pans 10, made preferably of sheet metal, such as galvanized iron, said pans being preferably of V-shaped cross section and provided adjacent to their inner edges with upstanding flanges 11, and at their rear ends with approximately vertical end walls 12. Said pans are otherwise of suitable construction to retain the insects that may be gathered therein, and their fronts ends are beveled divergently from their inner edge walls in an outward direction, as shown at 13, to present a wide space for the admission between the pans of the plants that are to be operated upon. The pans are to be beaded or otherwise suitably reinforced along their edges, and on the underside of each pan is secured a guide member 14 consisting of a wire, preferably of a resilient character, the free end of which is extended forwardly on the extreme front ends of the pan and thence curved inwardly and rearwardly to present spaced prongs 15 which are suitably curved in the direction of each other, as shown.

A handle member 16 is provided, the same being composed of a pair of tubes 17 which are suitably connected together at their lower ends by a clamp or collar 18 through which set screws 19 are threaded, one for each tube 17. The upper ends of the tubes are spread and spaced apart by a grip member 20.

Each pan is provided with a supporting member consisting of a rod or wire 21, a portion of which is bolted or otherwise secured lengthwise in the bottom of the pan, while an intermediate portion 22 extends upwardly and rearwardly to form a standard, the upper ends of said standards being provided with offsets 23 and with straight upward extensions 24 which engage the respective tubes 17 where they are secured by means of the set screws 19. A clamp consisting of two plates 25 corrugated to receive the upper ends 24 of the supporting members between them is provided, said plates being connected together by means of a bolt 26. The intermediate portions 22 of the supporting members are connected with the rear end walls 12 of the pans by means of hook bolts 27, thereby insuring the requisite degree of stiffness and rigidity to enable the implement to be conveniently handled without danger of injury.

In the operation of this invention, the operator pushes the implement along the ground, the pans 10 being disposed adjacent to the two sides of the row of plants. The pans are supported with some degree of resiliency by the supporting members 21 which, while holding the pans normally close together, will permit them to spread apart for the passage of the plants which latter are guided between the resilient prongs 15 which overhang the wide space formed by the divergently beveled front ends of the pans. As the implement is being pushed along by the operator, who controls the implement by holding the grip member 20 in one hand, the other hand is utilized to carry a broom, switch, rod or other implement with which the plants may be beaten and brushed to cause the bugs to drop into the pans from which at intervals they may be removed and destroyed.

While the pans are normally supported at the same elevation, it frequently becomes necessary, where the ground is uneven, to support one pan a slight distance above the other. This result may be obtained by properly adjusting the straight upper ends 24 of the supporting members 21 within the tubes 17 where they will be securely held by means of the set screws 19, the bolt 26 that connects the clamp plates 25 being loosened while the adjustment is being effected.

It will be seen from the foregoing description, taken in connection with the drawings hereto annexed, that a simple and efficient implement has been provided which may be manufactured at a small expense and by the use of which potato bugs may be quickly gathered, the implement being so constructed that it may be operated manually and also in such a manner that there will be no liability of the bugs dropping on the ground and thereby escaping destruction.

Having thus described the invention, what is claimed as new, is:—

1. In a device of the class described, a pair of gathering pans having divergently beveled front ends and resilient guide prongs overhanging said front ends, an elongated resilient supporting member for each pan, said supporting members having straight upward extensions, and a handle member comprising tubes wherein said extensions are independently and adjustably secured.

2. A device of the class described comprising two gathering pans having substantially vertical rear walls, said pans being of substantially V-shaped cross section, supporting members including elongated portions secured lengthwise in the bottom of the pans, upwardly and rearwardly inclined intermediate portions inwardly offset at their upper ends and straight contiguous upper portions, a handle member comprising a pair of tubes wherein the straight upper portions of the supporting members are slidably received, a collar connecting the lower ends of the tubes, and set screws threaded into the tubes through the collar and engaging the upper portions of the supporting members; and a clamp whereby the straight portions of the supporting members are adjustably connected adjacent to the offset portions.

In testimony whereof we affix our signatures in presence of two witnesses.

LEO J. DEUSTER.
CHAS. HONOUR.

Witnesses:
C. N. BRAATHEN,
OLE LARSON.

---

Copies of this patent may be obtained for five cents each, by addressing the "Commissioner of Patents, Washington, D. C."